(12) United States Patent
Driessen et al.

(10) Patent No.: US 7,742,993 B2
(45) Date of Patent: **\*Jun. 22, 2010**

(54) SCART-CARD (SECURE CONSUMER ADVANTAGED RETAIL TRADING)

(76) Inventors: James Leonard Driessen, 305 N. 1130 E., Lindon, UT (US) 84042; Joshua Aker, 305 N. 1130 E., Lindon, UT (US) 84042

( * ) Notice: Subject to any disclaimer, the term of this patent is extended or adjusted under 35 U.S.C. 154(b) by 1199 days.

This patent is subject to a terminal disclaimer.

(21) Appl. No.: 11/329,526

(22) Filed: Jan. 11, 2006

(65) Prior Publication Data

US 2007/0100707 A1    May 3, 2007

(51) Int. Cl.
G06Q 20/00 (2006.01)
G06Q 30/00 (2006.01)
(52) U.S. Cl. .............................. 705/64; 705/17; 705/26
(58) Field of Classification Search .................. 705/17, 705/26, 27, 64
See application file for complete search history.

(56) References Cited

U.S. PATENT DOCUMENTS

| | | |
|---|---|---|
| 5,033,184 A | 7/1991 | Tandai |
| 5,103,392 A | 4/1992 | Mori |
| 5,339,239 A | 8/1994 | Manabe |
| 5,530,751 A | 6/1996 | Morris |
| 5,568,550 A | 10/1996 | Ur |
| 5,592,511 A | 1/1997 | Schoen et al. |
| 5,629,770 A | 5/1997 | Brassil |
| 5,699,427 A | 12/1997 | Chow |
| 5,710,886 A | 1/1998 | Christensen |
| 5,745,569 A | 4/1998 | Moskowitz |
| 5,777,305 A | 7/1998 | Smith |
| 5,864,604 A | 1/1999 | Moen |
| 5,864,604 A | 1/1999 | Moen |
| 5,899,700 A | 5/1999 | Williams |
| 5,905,248 A | 5/1999 | Russell |
| 5,918,909 A | 7/1999 | Fiala |
| 5,920,878 A | 7/1999 | Demont |

(Continued)

FOREIGN PATENT DOCUMENTS

JP    411066152 A    3/1999

(Continued)

OTHER PUBLICATIONS

Muhammad, T.K., "Pointing the Way to Cyber-Success," Black Enterprise, vol. 27, No. 64, pp. 44-46, Nov. 1996.*

(Continued)

Primary Examiner—Nicholas D Rosen

(57) ABSTRACT

The present invention is an apparatus for the money transactions required in the selling of merchandise or media content on the Internet and uses at least one in-person contact with the buyer. A predefined transaction originating at a real place of business authorizes access to web content or merchandise from a place off the web. Purchasers (end-users) must physically go to a retail location to choose the Internet media or merchandise shopping cart they wish to acquire where age can be verified if necessary and payment can be made with or without a credit card. Content security using a non-audible or invisible code signal sequence(s) can provide traceability as well as absolute anonymity for the purchaser. This apparatus can be used to conduct transactions off the web so that business can be done on the web.

41 Claims, 10 Drawing Sheets

U.S. PATENT DOCUMENTS

| | | | |
|---|---|---|---|
| 5,933,829 | A | 8/1999 | Durst |
| 5,940,135 | A | 8/1999 | Petrovic |
| 5,943,423 | A | 8/1999 | Muftic |
| 5,949,885 | A | 9/1999 | Leighton |
| 5,953,415 | A | 9/1999 | Nielson |
| 5,995,105 | A | 11/1999 | Reber |
| 6,002,772 | A | 12/1999 | Saito |
| 6,005,643 | A | 12/1999 | Morimoto |
| 6,006,200 | A | 12/1999 | Boies |
| 6,018,720 | A | 1/2000 | Fujimoto |
| 6,035,177 | A | 3/2000 | Moses |
| 6,175,823 | B1 | 1/2001 | Van Dusen |
| 6,278,980 | B1 | 8/2001 | Wendkos |
| 6,385,596 | B1 | 5/2002 | Wiser et al. |
| 6,405,175 | B1 | 6/2002 | Ng |
| 6,434,535 | B1 | 8/2002 | Kupka |
| 6,467,684 | B2 | 10/2002 | Fite |
| 6,487,663 | B1 | 11/2002 | Jaismha |
| 6,615,247 | B1 | 9/2003 | Murphy |
| 6,708,157 | B2 | 3/2004 | Stefik |
| 7,209,889 | B1 | 4/2007 | Whitfield |
| 7,263,497 | B1 | 8/2007 | Wiser et al. |
| 2001/0001321 | A1 | 5/2001 | Resnick |
| 2001/0001854 | A1 | 5/2001 | Schena |
| 2001/0032878 | A1 | 10/2001 | Tsiounis |
| 2001/0037316 | A1 | 11/2001 | Shiloh |
| 2002/0029241 | A1 | 3/2002 | Yokono |
| 2002/0069104 | A1 | 6/2002 | Beach |
| 2003/0093335 | A1 | 5/2003 | Silverbrook |
| 2003/0142035 | A1 | 7/2003 | Goldstein |
| 2003/0158790 | A1 | 8/2003 | Kargman |
| 2003/0200179 | A1 | 10/2003 | Kwan |
| 2004/0015404 | A1 | 1/2004 | McCarthy |
| 2005/0080678 | A1* | 4/2005 | Economy et al. ............... 705/16 |
| 2005/0192896 | A1 | 9/2005 | Hutchison |
| 2006/0249570 | A1* | 11/2006 | Seifert et al. ................. 235/380 |
| 2008/0046375 | A1 | 2/2008 | Jakubaitis |

FOREIGN PATENT DOCUMENTS

| | | | |
|---|---|---|---|
| WO | WO-9819260 A1 | 5/1998 | |

OTHER PUBLICATIONS

Goldstein, A., "Computer City Opens Prototype, in Mesquite Texas," Dallas Morning News, Nov. 22, 1997.*

Microsoft Press Computer Dictionary, third edition, Microsoft, 1997, p. 82.*

Mambo, Masahiro, editor, "Information Security," Second International Workshop, ISW '99, Kuala Lumpur, Malaysia, Nov. 1999 Proceedings.*

Buelva, A.J., "Philippines: Union Bank Launches, 'Net Banking Initiative'", Computer World (Philippines), Dec. 15, 1999.*

*Driessen* v. *Sony et al.*; Def. Sony, Best Buy, Target answer and counter claim, Case 2:09-cv-00140-DAK Doc. 15, 15-1, 15-2 Filed Jun. 24, 2009.*

*Driessen* v. *Sony et al.*; Def. FYE answer and counterclaim, Case 2:09-cv-00140-DAK Document 14 Filed Jun. 23, 2009.*

Unknown, Electronic sell-through is the future of VOD, Broadcast Engineering, Strategic Content Management Newsletter, Jul. 26, 2005 USA.

Unknown, Coming soon: Download-to-own films, CNN, Technology Section, Mar. 24, 2006, USA.

Unknown, Schedule of Minimums, Writers Guild of America, 2008, Theatrical and Television Basic Agreement, Feb. 13, 2008, USA.

Netpack, Inc., Press Release, New Internet Packaging System, Allows Consumers . . . , Lexis-Nexis, Financial Times Information, Feb. 21, 2001.

Levi Shapiro, Hollywood goes EST, Entrepreneur Connect, Entrepreneur Media, Inc., Apr. 2008 issue.

Stephanie Olsen, CinemaNow debuts Download-to-own movies, CNET News, Jan. 4, 2004.

Jakubaitis, U.S. Appl. No. 60/140,929.

Superdistribution, (May 29, 2009). In Wikipedia, The Free Encyclopedia. Retrieved 10:45, May 29, 2009, from http://en.wikipedia.org/index.php?tilte=Superdistribution&oldid=2.

Tower Records Promotion, Case 2:09-cv-00140-DAK, Document 15-2, 15-3 (Jun. 24, 2009). Administrative Office of the U.S. Courts, PACER CM/ECF, retreived Jul. 23, 2009.

Pete Cashmore, Big Brother, Amazon Remotely Deletes 1984 From Kindles, retreived Jul. 23, 2009 from http://mashable.com/2009/07/17/amazon-kindle-1984/.

Remus, P.C. et. al, "Digital Signatures: THe Nest Step in Electronic Commerce," New Hampshire Business Review, vol. 19, No. 10, p. 15, May 1997.

Gentry, C.R., "Chain Cultivates Farming Niche," Chain Store Age, vol. 76, No. 3, pp. 67-77, Mar. 2000.

Anon., "Appearing Soon at a Store Near You: An ATM for the ears," New York Times, vol. CXLIX, No. 51,364, P.D7, Apr. 2, 2000.

Anon., "Mala Powers: Hollywood Star Still Shines on Walk of Fame," Business Wire, Sep. 27, 1994.

Dyson, P., "Millicent: Digital Equipment's Scrip for Selling Content by the slice," Sybold Report on Internet Publishing, vol. 2, No. 3, p. 37, Nov. 1997.

Oser, K., "Wells Fargo Launches ATM Advertising," Direct, vol. 11, No. 5, p. 22, Apr. 1999.

2:09-cv-00140-DAK *Driessen* v. *Sony BMG Music Entertainment et al* Bates No. SNY00000001-SNY00000195.

*Driessen* v. *Sony et.al*; Def. Sony, Best Buy, Target answer and counter claim, Case 2:09-cv-00140-DAK Doc. 15, 15-1, 15-2 Filed Jun. 24, 2009.

*Driessen* v. *Sony et.al*; Def. FYE answer and counter claim, Case 2:09-cv-00140-DAK Document 14 Filed Jun. 23, 2009.

* cited by examiner

FIG. 7
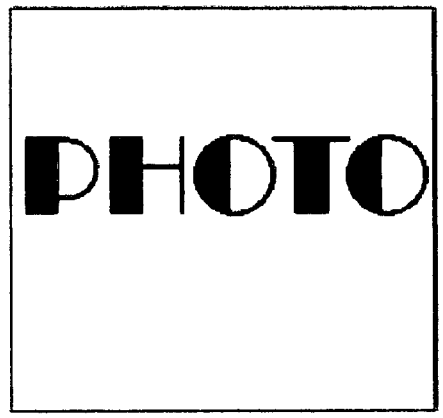
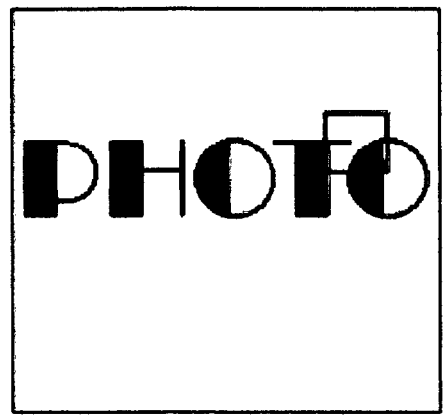
Zoom of Selected Area       Pixel Selection
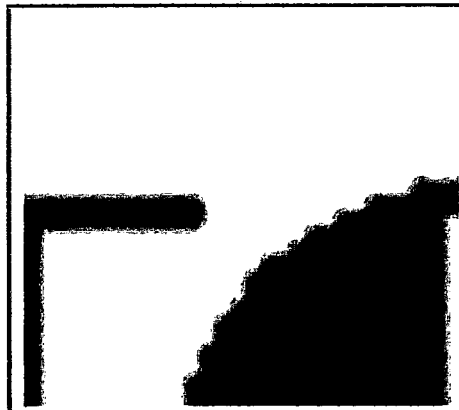
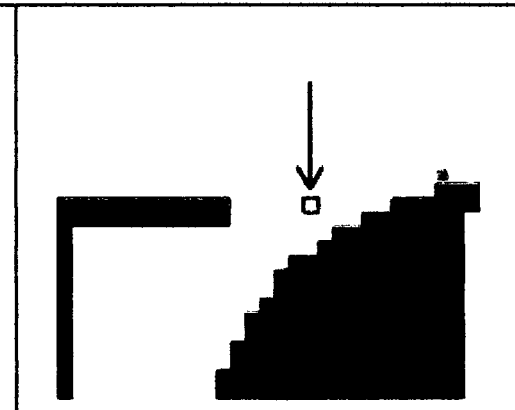
Normal Pixel      Example: After hidden pixilization
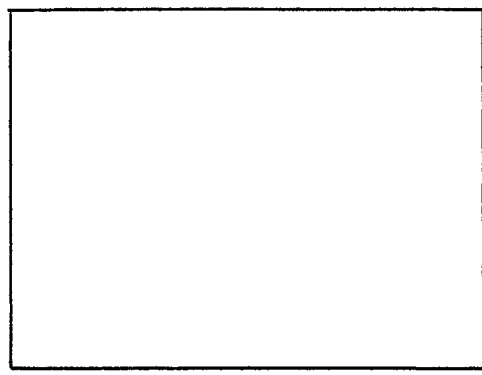
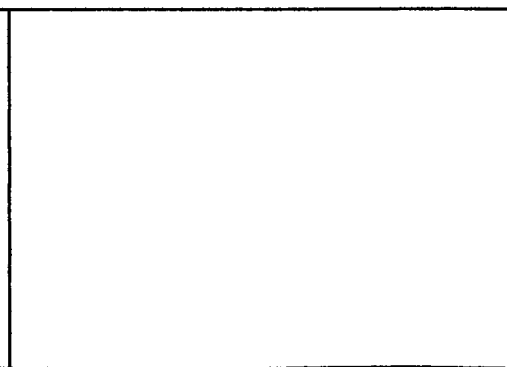

FIG. 8

| Courier 10 BT | Courier New |
|---|---|
| A | A |
| B | B |
| C | C |

SCART-CARD (SECURE CONSUMER ADVANTAGED RETAIL TRADING)

RELATED APPLICATIONS

Priority is claimed in this application to the Continued Prosecution Utility patent application Ser. No. 11/262,855, filed on Oct. 31, 2005, claiming priority to Utility patent application Ser. No. 09/630,272, titled "Retail Point of Sale Apparatus for Internet Merchandising," filed on Aug. 1, 2000. Priority is also claimed through Ser. No. 09/630,272 to a provisional patent application submitted on Jun. 30, 2000, entitled Access Card for Internet Content (ACARD), provisional application No. 60/215,673.

FEDERALLY SPONSORED RESEARCH OR DEVELOPMENT

Not Applicable

SEQUENCE LISTING, TABLE, OR COMPUTER PROGRAM ON CD

Not Applicable

BACKGROUND OF INVENTION (1) Field of the Invention

This invention relates generally to purchasing systems via a public computer network system (Internet or World-Wide-Web). While the products sold on the Internet are often real and tangible, the market place exists in a virtual realm. To conduct the business of selling in the virtual realm of the Internet, a virtual transaction had to take place; or so it has been thought. This Invention requires non-virtual transactions that take place at a retail point of sale for a means of virtual merchandising.

(2) Related Prior Art

Retail industries can exist anywhere. The historical version of retail was the actual retail point of sale. A retailer established a store where customers could visit, look at merchandise and make purchases. The customer had to visit the store in order to purchase the products. Other forms of retailing have existed like local street vendors, door-to-door salesmen, shop-by-telephone, mail order catalogs, infomercial shop-by telephone, and most recently, the Internet.

To understand the difference between this invention and prior art, one must first be able to understand the differences between retail point of sale and other methods of sale. There is always a time variable involved with merchandising transactions, but one should not make the mistake of assuming that time is the essential element that distinguishes between direct purchases and those on account. The basic formula for establishing a credit account is where the purchase price (P) of a product can be paid at a later time (T), an interest rate (R) can be assessed, and the amount paid $(A)=P(I+R)^T$.

A person may gain extra time to pay for a purchase by using credit, but it is the agreement between parties that one will extend credit to the other that creates a credit account. Time has no meaning in the direct purchase formula (A)=P. For that matter, there is always some lag between the time payment is tendered and possession takes place even if for just split seconds. Sometimes a lag between payment and possession requires a voucher so that the purchaser has some proof that payment has been made. The voucher is usually just a simple sales receipt. Other times it can be a ticket such as for attending a theater or other engagement. The voucher in this case does not represent an account or value of money. The voucher merely represents that the transaction has been completed and the merchandise, whether physical merchandise or simply entertainment, has been authorized.

Retail points of sale transactions involve at least one in-person contact with the buyer. On the Internet, it has always been assumed that this transaction must be conducted virtually on the Internet; after all, the Internet is a virtual realm. With the huge rise in popularity the Internet, there are rising concerns from the public about who should and who should not be able to access certain Internet content such as but not limited to: materials with copyrights such as music, content that is adult in nature, or other restricted access material.

Regulatory authorities and web masters have made attempts to control access through the selling of access rights over the Internet itself. These services are often called subscription based I.D. or age verification services. User names and passwords or other means of secure access have been delivered to consumers after they entered credit card information. This has become an accepted means of control, particularly with Adult Verification systems.

Public Key infrastructure (PKI) is one method that has evolved into a secure and anonymous means of handling web transactions through the uses of encryption, trusted vendors, and trusted banking institutions. PKI methods of Web transactions involve digital signature and money transactions over the Internet. They require a customer, a bank, a merchant, a public archive such as an Internet web site, Certificate Authorization servers, and encryption and decryption of the data.

Most secure web transactions require cookies and Web delivered applets (such as JAVA). A cookie is information that a Web site puts on an end-users hard disk so that it can use the information at a later time.

Using the Web's Hypertext Transfer Protocol (HTTP), each request for a Web page is independent of ail other requests. For this reason, the Web page server has no memory of what pages it has sent to a user previously or anything about previous visits. A cookie is a mechanism that allows the server to store its own information about a user on the user's own computer. For example, the Internet Explorer browser stores cookies in a Windows subdirectory. Netscape stores cookies as a single text file.

RETAIL POINT OF SALE APPARATUS (RPOS) FOR INTERNET MERCHANDISING is a return to the simplistic approach of pre-Internet ways of doing business, but it is not an obvious approach. As malicious attackers of Internet communications become more common, the Internet security measures become increasingly sophisticated. The RPOS takes away some of the sophistication and uses much simpler yet effective technology in its place. The predefined transaction authorizes access to web content from a place off the web, originates at a real place of business, and is a concept that a trained Internet professional may not be able to grasp immediately; they have been conditioned towards more complicated means of accomplishing the tasks directly on the Internet.

A return to a retail establishment for conducting Web business may hold great promise for Internet security in the future. A search of past practices and inventions reveals a great deal of effort spent on avoiding over-the-counter transactions for Internet e-commerce rather than embracing it as does the RPOS technology.

(3) Prior Art Differentiated

There are three key questions to be asked when attempting to differentiate the technology:

Do they take cash?

Is there an establishment that acts on behalf of the customer for payment that employs non-virtual (Retail point of sale) to complete the transaction?

Does the customer have to physically go to the establishment to buy it?

The field of Internet e-commerce has numerous existing patents. A complete search for prior history was not done prior to this filing but a few similar patents were found through a most basic search of the on-fine USPTO patent databases. They are reference below to help set the stage for one skilled in the art of Internet commerce to understand the differences between RPOS and previous methods.

This invention is not a Prepaid Internet Access Card, such as used to supply the purchaser of minutes on an Internet Service Providers (ISP) system, see examples U.S. Pat. Nos. 5,749,975; 5,987,612; 5,749,075, 5,987,430.

This invention is not merely a method for recording information on a card, computer disk, or other means of recording, see example U.S. Pat. No. 6,076,733. The method of recording might be bar code, magnetic tape, smart card, written inscription, or any means of recording information. This invention is not used to locate a specific URL, but is used to divine the predetermined transaction that provided access to a particular URL location.

This invention is not an organizational Internet access security system whereby business organizations control access to web content of their own employees or to others on a closed network or to generate personalized content pages for specific business purposes, see U.S. Pat. No. 6,076,166

This invention is not an Internet cash token system used as an anonymous means to get money to spend on the Internet. See examples U.S. Pat. Nos. 6,076,078; 6,072,870; 6,061,660; 6,042,149

This invention is not electronic-voucher system, which places a third party URL as the guarantor of funds. See example U.S. Pat. No. 6,058,381.

This invention is not a mobile Internet media content delivery device in which the device itself carries the content. See examples U.S. Pat. Nos. 6,018,720.

This invention is not a means to preview merchandise and set up an account to purchase—as in U.S. Pat. No. 5,918,213, where the merchandise merely previewed at the point of sale, but then the transaction is conducted as an off the shelf purchase, through typical Internet methods, or phone-in-sale automated means. The retail point of sale apparatus for Internet Merchandising is a new means for conducting the actual transaction that could be added to such a system.

This invention is not a device for delivering media content through on-line programmable smart card authorization such as used in satellite television programming, or Web TV devices, where a home user of the system can call in on the telephone to order Pay-per-view programming. In these systems the smart card both receives and supplies data to the system over a private network. RPOS does not require programming after the initial over-the-counter transaction.

Although the user of the RPOS may be known, it can also be used completely anonymously.

This invention is much like an event ticket to a movie theater or music concert except that the RPOS is specifically used for access (entrance) to Internet merchandising.

While RPOS can facilitate Secure Web Transactions, it is not a method of the transaction, merely a method of divining the existence of a predetermined web transaction. It does not require a trusted vendor, trusted bank, or buyer authentication. While RPOS may facilitate some of the same types of functions mentioned above, it uses a completely new method.

BRIEF DESCRIPTION OF THE INVENTION

This invention is essentially retail point of sale for the Internet. In order to best set the stage for a reader of this patent application to best understand the background of this invention and distinguish it from prior art, several descriptive names of the invention are listed below. This is not intended to be an exhaustive list but merely illustrates some of the ways such an invention can be used. After this list, for the remainder of this document, the Invention will be referred to as the RPOS. Although it involves a voucher system, the voucher need not exist in all circumstances. RPOS can use a disk, paper ticket, memory stick, or any other means of supplying an access key and utility program.

Descriptive Names

1. Internet Content Voucher System
2. Cookie Free Cache Back System Card
3. Prepaid Card for Internet Content Media
4. Web Content Ticket
5. Over the counter Internet Sale
6. Simple Anonymity for Internet Content Delivery
7. Face to Face Verification System for Divining of Anticipated Internet Transaction
8. Non Virtual Point of Sale for the Internet
9. Retail Point of Sale Card for Internet Content
10. Internet Authentication Card
11. Internet Adult Verification Card
12. Internet Allocation Card The RPOS is an "actual point of sale" device for Internet content. Previous waves of invention attempting to satisfy the needs of secure web content on the Internet have delivered many "virtual point of sale" techniques and emphasis has been on the transaction itself and how to exchange money over the Internet.

When considering Prior art, the RPOS invention differs most noticeably from previous methods in the way it does not follow the trend to do everything on the Internet and uses "actual point of sale" as the place where a predefined Internet sales transaction takes place. The information provided by web delivered cookies or applets is not required by RPOS because the information is already included; it is hand delivered to the computer by the user.

DESCRIPTION OF INVENTION

A security access key is provided in the form of a prepaid card sold as a retail item. The access key has a one time or multiple Internet session use as provided by the seller of the card. Through obtaining the CARD, the purchaser gains access to the website or specific web page(s) intended by the seller for either a defined duration of time or indefinite duration of time. Any time the end user (customer) of the CARD is on the Internet, a very simple utility program may be deployed to ensure that there are no changes to the cache content of the customer's computer and no cookies are accepted or transmitted during the delivery of the media content. The utility of the invention is that it provides a method of controlling web access that requires at least one transaction be completed in person. No connection to a banking system for credit referencing is required, no vast system of computer networks is needed to verify anonymity and account status. The actual transaction takes place over the counter. The delivery takes place on a computer of the users choice.

The CARD is a voucher system that is used only to authenticate that the user of the card is in fact the one in possession of it. The user of the CARD uses the card to access the content or merchandise from the computer of their choice. As the time required for the user holding the card to receive the desired content is decreased, the need for the CARD itself may become unnecessary. The content itself may be recorded to disk compact disk, cassette, VHS tape, or other recording media: the media may be recorded at the point of sale location.

The content that is recorded may be Internet content media or the content may be the purchase agreement for merchandise. When the content is a purchase agreement for merchandise, also called an Internet shopping cart, the payment can be made for the merchandise by the RPOS. The RPOS assumes responsibility for payment to the Internet vendor and the purchaser specifies the shipping address of such merchandise. The CARD in this situation may simply be a receipt of sale or other proof of payment.

Unlike any previous method of payment for Internet commerce in the past, there is no account, credit, or other means of electronic payment required for the buyer in the transaction. The proof is within the content itself. The content becomes the verification of a sale. Internet merchandisers such as but not limited to Amazon, Barnes and Nobel, Buy.com, Outpost, and others provide a verification page for each sale, which they intend to be printed by the user. These types of verification pages are excellent examples of specific URL information that can be determined ahead of time and sold whether it is for merchandise or content media.

When the purchase is for non prepackaged merchandise such as Content media, the media may be individually licensed with a unique serial number for protection against counterfeiting. Content fingerprinting is one of the methods used. Traditional digital signature may also be used.

Content Fingerprinting,

In the Industry of Internet publishing, one of the problems has been unauthorized copying, posting or otherwise revealing of sensitive materials for wide distribution. Millions of dollars in uncollected royalties are lost each year. Publishers have no way of detecting the responsible parties who willfully post the materials or otherwise "leak" the materials for wide distribution. The answer to the problem is a mechanism or way to "mark" individual copies of recorded material for licensing so the publishers can feel confident that appropriate royalties are being paid. The "mark" should be something not easily detected or removed.

The Graphical User Interface (GUI) of the program uses two side by side text windows, One window is for the visible message and the other window is for the shorter encoded information, Once the two messages are input, the user clicks on a button for encoding which makes all the necessary adjustments to encode the hidden information into the visible message and saves to one file.

This document suggests just some basic methods of fingerprinting Internet content: Font Fingerprinting, hidden pixelization, concealed ASCII and non visible/inaudible codification.

Font Fingerprinting

Bar codes are typically comprised of black and white stripes, yet all that a bar code really represents is a binary code. For Font Fingerprinting of Internet content, hidden binary codes are placed into documents so that a specific record of the content travels with the document. It is much different from digital signature for example where the file itself is tagged and encrypted and can't be read unless the proper keys are used to decrypt the message. For fingerprint marking of the document, the mark stays with the document even after it is properly received and possibly changed.

A base font is modified only slightly so as to not be immediately noticeable to the human eye, yet enough for machine recognition. The base font becomes the "0" of the binary and the modified font is the "1". Any text string can be modified to imprint a binary coded binary (BCB). The decoding is later accomplished using a scanner with a character recognition system capable of distinguishing the font differences.

Font fingerprinting is particularly designed to be most readily used for printed media, but the fingerprinting could also follow a soft copied document provided the file format remains Rich Text Format (.RTF) or better, giving access to the font aberrations. The font set used for printing the "fingerprinted" document must also be available to the computer that receives the document. Future developments could include a highly compressed file format capable of self decompression that would mask the fact that the Distributed font set is traveling with the document.

Another method of sending a font generated BCB with a softcopy document, not requiring a font subset file, mixes two available fonts that are a close match such as Courier New with 11 point font and Courier 10 BT with a 10 point font (see FIG. 9).

While the above mentioned combination is readily visible to the naked eye, the text is not noticeably different unless you know what you're looking for. It was just an attempt at finding a good match, but there may be other good system fonts that are a close enough match.

Hidden Pixelization

The format of choice for delivery of images over the Internet has been the jpeg, formally the ISO standard 10918, which keeps the file size for delivery fairly small. All digital images of this type are made up of tiny pixels. For hidden pixelization, a jpeg image is converted to a similar image of a higher resolution (more pixels). In other words any single pixel in the original image is recreated as multiple pixels all of the same color. For example a 320×240=76,800 pixel image becomes a 640×480=307,200 pixel image, or roughly four pixels per one pixel of the original image.

Several of the pixels from these new higher resolution images can then be encoded with a BCB by varying the shades within the 4 pixels only slightly leaving the neutral color of the original larger pixel essentially unchanged. Any documents delivered over the Internet that contain these images are thereby permanently marked.

This re pixelization creates four available binary codes in the original pixel. The original color is the "0" code and the slightly changed shade is the "1" of the binary. One of the keys to making this system less detectable is to disguise the encoding by causing the encoded jpeg file to still report to the user that it is still a 320×240 image when in fact it has been changed to a 640×480 image and then report back to the viewing system the proper resolution. If the user resaves the image into a different format such as GIF, the code may or may not be transferred, but as long as images in documents are untouched, the document remains fingerprinted.

Concealed ASCII

ASCII stands for American Standard Code for Information Interchange. ASCII was developed a long time ago and the characters are not always used in the same way on different computer systems. ASCII was originally designed for teletypes and the first 31 characters in today's applications are no longer used as originally intended. Concealed ASCII finger printing takes advantage of the fact that several of them act the same as the ASCII character "032" in many applications. ASCII 32 is the code for a blank space.

ASCII characters 0, 10, and 13 do not display anything on most Windows applications. Character 9 will move to a tab, making a long blank space. 16 25 and 27 31 produce a black area on the screen in some applications and a blank area in others. So do 19, 11, 12, 14, and 15 on some Windows applications; however, they often cause error messages in the compiler for many applications.

Concealed ASCII can create a BCB by using the standard ASCII 32 in spaces as the "0" character of the binary and an alternate ASCII 0, 10, or 13 with ASCII 32 as the "1" character of the binary.

Example: The quick gray fox jumps over the lazy brown rabbit.

There are nine spaces to use for the BCB in the preceding phrase. The code in the example above reads 010000111. The code for the 2nd, 7th, 8th, and 9th spaces in the phrase is ASCII 10 followed by ASCII 32. The remaining spaces simply use ASCII 32. While the concealed ASCII fingerprinting is not printable, it can be used to travel with text of a printable document Concealed ASCII can easily be lost when transmitted as plain text over the Internet and other systems, but many documents are transmitted over the Internet in specific file formats that would maintain specific ASCII sequences not visible to the reader without looking to the particular codes that generated the text.

Non Visible or Inaudible Codification

Analog signals of non discernable frequencies for human ears or eyes are individually dubbed into audio recordings, which can later identify the origin of the recording. The sights or sounds are created using a frequency, signal generator, or other means of creating analog signals. The analog signals, which cannot be heard by humans on the recording, can be used for distribution of copyright materials such as mp3 music or dubbed into the soundtrack of a video that is distributed on the World Wide Web (Internet).

Identical songs or videos by the same artist can become individual versions that are licensed to individuals. Using sensitive digital software and computer sound editing tools available from a number of manufacturers the sights and sounds outside the range of human discernment can later be detected to verify if the recording is in fact licensed and who is the owner of the license. The analog signals essentially encode any individual identification to a song, video, or other media that contains audio or video tracks.

The human sound range is between 20 and 20,000 hertz for a young person and much less for an old person. The human visual range for light fits within a range around 109 MHz. Visual analog signals can also be dubbed into digital video recordings. The key to non visible or Inaudible Codification is merely that that signals are dubbed into the content and not just on the file itself Content Fingerprinting Usefulness Content fingerprinting would be used for printing secure documents, discouraging unauthorized use, sending secret encoded messages, authentication of modification of documents, counterfeit detection, or other application requiring secure distribution of Internet materials. Content fingerprinting differs from digital signature or digital watermark in that the fingerprinting is not on the file itself but on the content of the file.

Fingerprinting documents is a useful and new idea. The usefulness of the specific methods shown here is greatly diminished when patented and the PTO discloses to the public. The actual methods of fingerprinting really should be kept as "Trade Secrets". The above methods are not fool proof or even sophisticated enough to hold up against even the least sophisticated of hackers. They are merely offered here as examples of how to individually license Internet materials. As industry looks to the Internet for delivery of every kind of copyrighted material, there will be other specific methods of fingerprinting. Since, nobody is working on this type of copyright protection: the concept itself might be of strategic advantage. Fingerprinting Internet delivered media may involve documents, images, videos, sound tracks, or any other type of media that can be produced for the Internet.

The method of providing a level of security in transfer of ownership for prepaid media content over a public computer network (Internet) using a computer can be accomplished using individually coded license, serial number, or other identifying mark through content fingerprinting.

It can use first a visible, audible, or otherwise humanly detectable label version of serial number, coded license number, or other identifying mark; a second label that is only machine visible, audible, or otherwise detectable version of serial number, coded license number, or other identifying mark; and the machine only visible, audible or otherwise noticeable label could be a coded message capable of singularly distinguishing the content from other content of the same or similar type. Any means of recording, writing, or otherwise placing a machine visible or audible code on Internet media content would be useful for content fingerprinting purposes.

Return Merchandise and Retransfer of Ownership

The CARD can also create many advantages over the prior art in the area of tracking of first sales in copyrighted materials, returns of such sales, as well as retransfer of ownership in copyrighted materials or other merchandise. It is well known in the art that Title 17 of the United States Code outlines the specific and exclusive rights of copyright owners. Original artists for copyrighted materials have the exclusive right to prevent others from copying, using, or destroying copyrighted works. Particularly 17 U.S.C. 107 §106 and §106 (a) without other exceptions would disallow anyone from modifying or destroying a copyrighted work. However, §107, §109, and other case specific copyright licensing legalities allow end-users of copyrighted products to sell or destroy their licensed product without the artists permission as well as the make "backup" copies for personal use, which become useable licensed copies, in the event that the original licensed copy becomes damaged or destroyed.

For purposes of novelty and nonobvious requirements of patentability, this application shall not claim any rights to the workings of U.S. Copyright statutes or lay claim to any particular judicial interpretation of statute. However, to best understand the benefits of the present invention, one should have a fair understanding of the both U.S. copyright law in relation to what may be considered patentable subject matter. Particularly, knowledge of U.S. copyright law may be especially helpful as to the understanding of the business methods herein disclosed. While the Federal Circuit has not yet defined what specifically characterizes a business method claim and separates it from other process claims, the Court has stated that claims drawn to a method of doing business should not be categorized as a 'business method' claim, instead they should be treated like any other process claim. Love, John J. and Coggins, Wynn W., *Successfully Preparing* and Prosecuting a Business Method Patent Application, AIPLA, Spring 2001, quoting State Street Bank & Trust Co. v. Signature Financial Group, Inc. 47 USPQ2d 1596, 1604 (Fed, Cir. 1998).

The above specification already described a method for creating and tracking a digital backup copy using content fingerprinting. A thorough reading of this section of the specification should facilitate the reader's attention to those above disclosures. When we take a closer look at 17 U.S.C. §202 in an expanded setting of the meaning and purposes of the entire Title 17, we can see a suggestion that an authorized user can also convey the rights in copyrighted media itself, regardless of the existence of or current form of the original media object. So long as the work remains some type of unique and tangible object, the transfer of authorized license for consumer use may also remain intact without the transfer of the original object.

Perhaps because it is an unfamiliar concept, very little attention has been given to the concept of creating a digitally licensed copy out of an already existing licensed copy. Much of the publishing industry's fight against recent piracy of copyrighted materials on the Internet has focused on the stopping of completely unauthorized distribution of infringing copies.

It is well known in the art of copyrighted materials that the copyright owner is entitled to a certain amount of rights often referred to as the owner's "bundle of sticks." The owner can then choose to sell or license those rights as a whole or break up that "bundle of sticks" in any way as the owner sees fit and desirable to her.

Under the "first sales" doctrine, the exclusive right to vend copyrighted material objects (such as books, vinyl albums, tapes, CDs, DVDs, and various downloadable formats) has been limited to the first sale of any one copy and exerts no restriction on the future sale of that one particular copy, it only restricts against transferring or selling unauthorized copies. This second sale or retransfer of those rights to another party could be compared as an equivalent to a person bequeathing their entire library of books, music, and movies to another person in their last will and testament. Upon the death of that person, the heir may certainly be entitled to ownership of those media material objects and the listening or viewing rights have also been transferred to the testator's beneficiaries.

Likewise, in the present invention, the content fingerprinting portions of the above specification described a disrupting technology to the current legal formula which could allow a consumer controlled copy of an existing authorized media format which could transfer ownership to a third person (i.e. second sales) even if electronically transferred. However, since the legalities of any such retransfer of listening or viewing rights would become a question for a court, which certainly at the time of this application has not been convened, the novelty of any process which was described in the above specification may still be patentable subject matter and the usefulness of such an invention need not depend on a courts interpretation of copyright law.

No matter how any Court in the issues of Copyright infringement would choose to define the disruptive technology, even stated in the best light to the copyright owner, the thorough ability to track and enforce non-authorized copies of copies, have provided a legal chain of traceability in the past and various technologies have been known to accomplish serial tracking in the prior art.

The present invention offers improvements over previous methods in that every copy may be traced back to the original licensed copy even if formatting changes in the file or content have taken place and there is still an original media material object that exists separate from the content, namely the CARD. The present invention may thus become a legally disrupting technology worthy of exemption under the first sales doctrine of §109 for infringement. And herein, those disclosures can be the basis for process claims of how to accomplish such an exemption if one were to be carved out under the statute.

Since at the time of patent application for the present invention, the particular methods as disclosed herein had yet to be carved out in a court of law, attention can now be drawn to the same invention as described above, only in relation to the copyright laws of the United States. Without any further need to describe the invention further, a method for creation of the legal digital back-up copy is described in the above embodiments of the invention and attention has now merely been drawn to those above disclosures.

If a media material object such as a book, tape, CD, or DVD containing copyrighted material is copied and transferred using the CARD or any of the above taught methods with or without content fingerprinting, if the original "first sales" version of that same media material object is prevented from further circulation (impairment), and if the process is then somehow validated to show reasonable proof of such impairment; then the copy of that of that original "first sales" version may not be a "copy" at all under the meaning of §109 for infringement purposes. Much the same way that a set top player may hold a "copy" of the media in memory buffers during playback, in the present invention a one to one relationship between the "transfer" media and the original media can maintain "first sales" consistency.

The process can be described by the formula: Copy+SCMS+Impairment Validation=Legally Transferable Backup, where Copy equals the act of creating a backup of the original, SCMS equals a serial copy management system, and impairment validation equals a reasonably traceable record of the original being taken out of circulation and the particular "transfer" media created, which is not a copy of the original media under the meaning of §109 first sales doctrine.

The prior art contains many instances of ways to copy, many ways to create serial copy management systems, and many ways of legally defensible methods of tracking or recording validation of procedures. However, the prior art does not recognize the entire method as explained immediately above along with methods previously described in the above disclosure.

The question of Legality in the "Legally Transferable Backup" in the above mentioned formula may be left up to a court to decide, but the methods described herein, which are novel and useful means of accomplishing a transferable backup, are what encompass this particular embodiment of the invention.

POS Merchandise Scanning and Activation

The use of image-based bar code symbol readers and scanners is another aspect of the invention that has been well known in the field of auto-identification. Examples of image-based bar code symbol reading/scanning systems include hand-hand scanners, point-of-sale (POS) scanners, and industrial-type conveyor scanning systems.

One embodiment of the present invention would allow a user (consumer) to carry a hand-hand barcode scanner with him/her while at the retail point of sale location. Virtual downloadable items, sample items, or other merchandise can be viewed or tried in the retail setting and then can be itemized and "loaded" onto the RPOS CARD via the hand-hand barcode scanning unit. That scanning unit may then serve a dual purpose as the CARD since the CARD can be anything which can hold an itemization of one or more pieces of merchandise or media.

The user (consumer) is thus able to scan in items to be placed on or into the CARD voucher system either in real time or while checking out. The specific merchandise can be predetermined during the selection process and then activated to the CARD at the time of checkout. This is not account activation, but transfer of ownership rights activation. This way the items are added to the CARD by the user in possession of the CARD.

As the size and shape of the required imaged based bar code symbol reader components are reduced, the combination scanner/CARD system can become more convenient when used as one in the same unit. Putting the scanner and the CARD voucher system together further simplifies the process of associating specific predetermined or itemized merchandise with a retail point of sale Internet transaction.

Presently, most commercial image-based bar code symbol readers are constructed using charge-coupled device (CCD) image sensing/detecting technology which is well known in the art. Other bar-code symbol readers employ laser-based scanning technology, but CCD imaging technology may be the preferred embodiment because it can be adapted to particular illumination requirements needed for different applications. Other methods of imaged-based symbol recognition could also be used. The scanner/CARD combination can be large or small, but smaller is normally better. Ideally the Scanner/Card system will fit into a person's pocket or into a wallet such as a credit card size device, but smaller is only better as long as the user can still hold and operate it by hand, but the mode of operation by hand or by any other human interaction is not critical to any particular embodiment.

What makes the scanner/CARD combination system functional is the ability to use image sensing/detecting technology capable of scanning several barcodes and holding those scans into memory, being transported to a check-out location for a face to face transaction and also serving as a CARD for divination of the transaction.

Size of the unit will also not affect the preferred embodiment and/or best mode of this aspect of the invention, because best mode will depend on the application for which the present invention is used. Herein, however, the selected preferred embodiment is component based and the size of the unit is therefore not specified, because no matter the size of the symbol reading unit used, this embodiment of the present invention merely facilitates the process whereby specific Internet merchandise is predetermined through scanning. Just like other embodiments described herein above, merchandise is added to the RPOS voucher system ("loaded") which is the activation of ownership rights in the merchandise at the point of sale.

Therefore, stolen RPOS voucher or CARD systems which have not been activated (predetermined) at the retail point of sale are useless to the thief. While there are many methods for point of sale activation that are old in the art, unlike the CARD system, they have all been activation of accounts.

Point of sale activation of merchandise rather than an account is a completely new concept. In one embodiment, the activation can be a tracking of time, which is the time when the merchandise has been activated. In the present invention there is an identification of the individual CARD that can be seen outside whatever packaging is used. Then when the card is purchased, identification information is entered at the time of sale to establish the time of sale for that individual CARD. Other methods can include hidden or otherwise invisible to the user individual CARD identifiers. The CARD can also be reusable or contain more than one item of merchandise. In those scenarios, other methods of identification of the specific transaction may be used whether internal to the CARD or a visible means on the CARD, but CARD identification means will still relate to the time of purchase as previously described above with the formula $(A)=P(I+R)^T$. With the present invention, however, the preferred embodiment uses the formula $(A)=P$, as described above, meaning either the merchandise is immediately activated at time of purchase, or if some funds transfers do take place only for system compatibility purposes with other point of sale equipment, then the funds are "loaded" and as close to simultaneously as possible within that system the funds are also withdrawn to complete the payment still under the $(A)=P$ formula so that no interest may accrue or as according to agreement if longer times are required.

DESCRIPTION OF DRAWINGS

The following drawings provide examples of different applications and construct specifications for the RPOS technology. They are not meant to be inclusive of all uses, they are merely examples.

Figure 1:
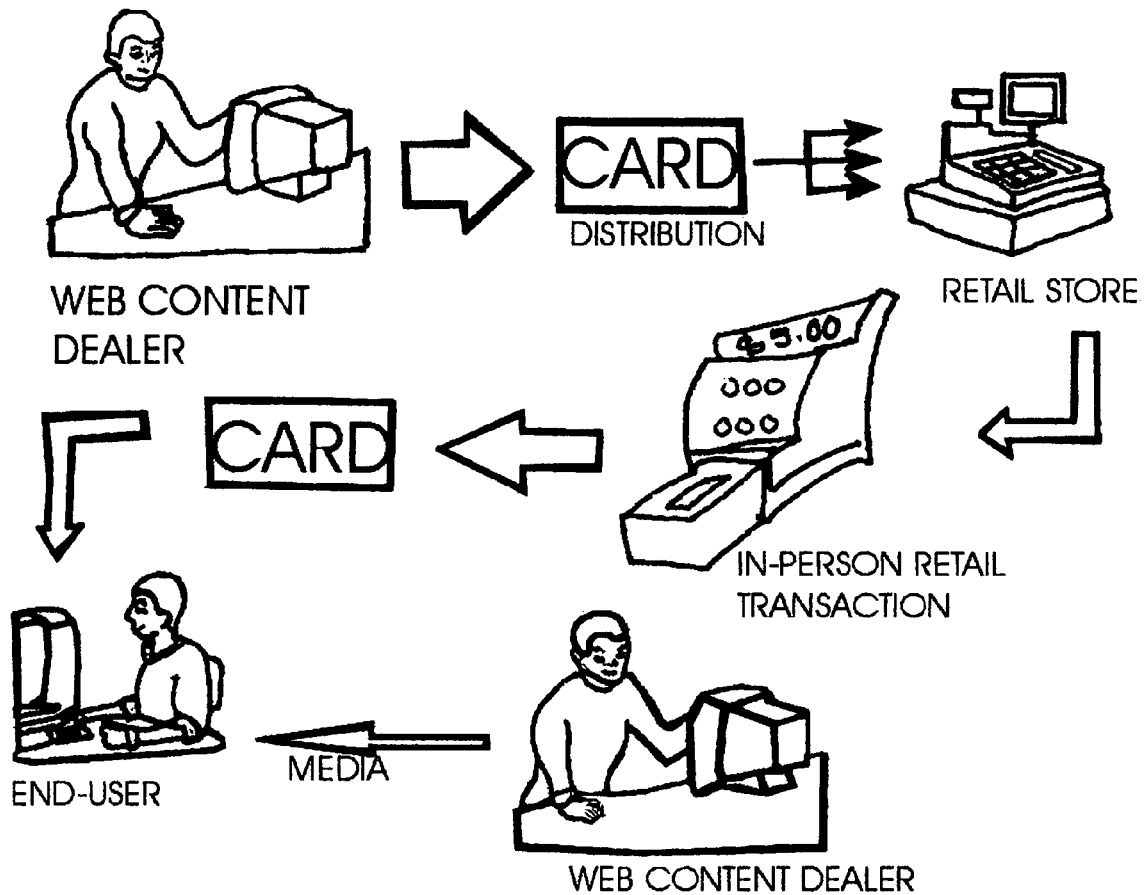
FIG. 1 uses a flow chart to illustrate a use of the RPOS. The process begins with web content dealers who have content posted to a public computer network (Internet) and have chosen to use RPOS for distribution. The web content dealers may manufacture the card themselves or use a third party. The type of security system used for placing the access key on the card is only important as to the particular level of security that is desired. The web content dealer then distributes the ACARD, directly or through distribution channels, to a retail establishment. The retail establishment sells the CARD over the counter to the customer. The dealer, distributor, and retail establishment may use whatever profit margins or price mark ups as they choose or is agreed upon. The CARD is delivered to the customer like any other retail product. Continuing along the flow chart in FIG. 1 to the customer, the CARD is used to access only the web content that is predefined by the CARD. The purpose of the CARD in this transaction is only to ensure that the user is in possession of it. The transaction takes place through an over the counter sale.
Figure 2:
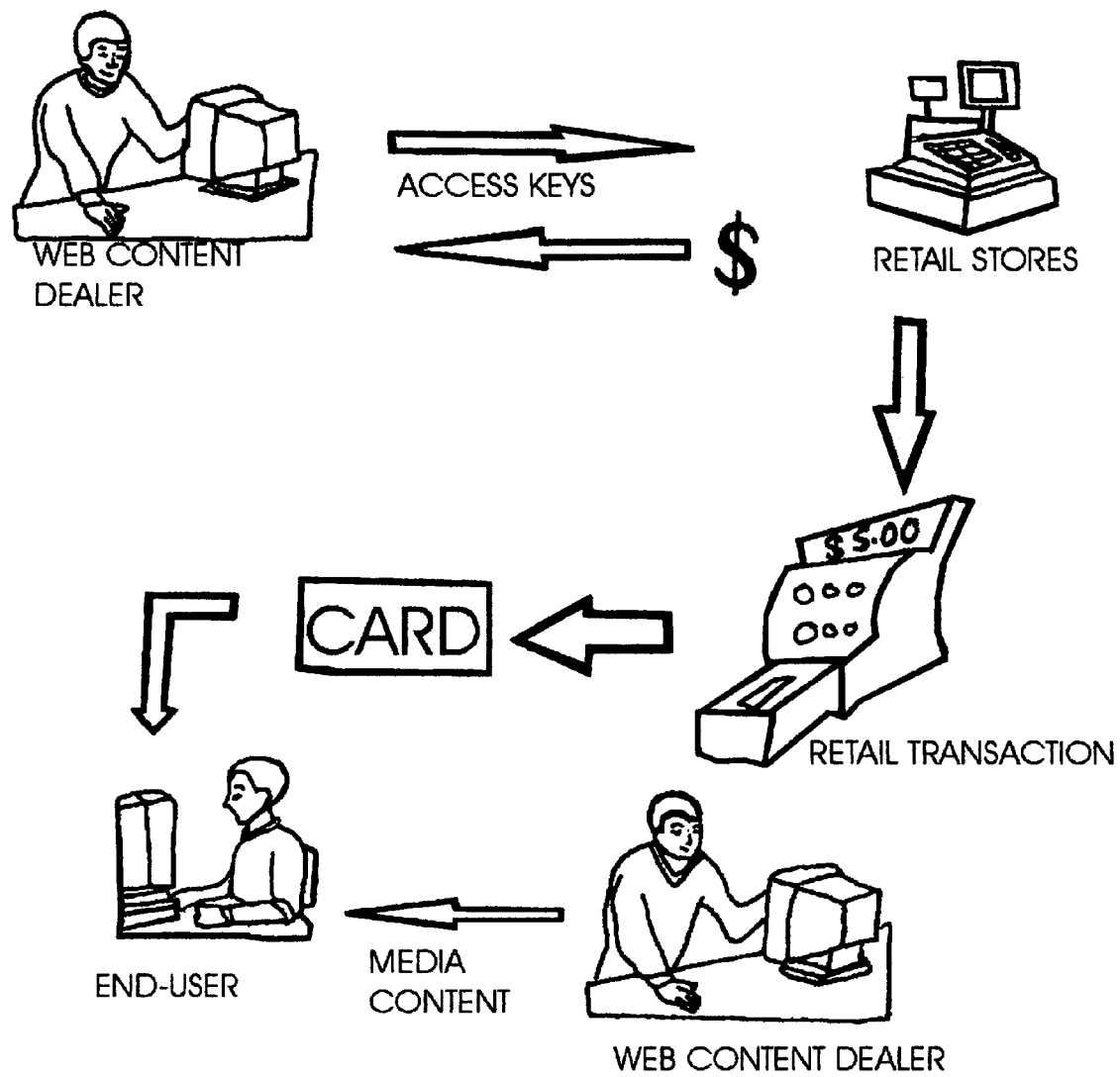
FIG. 2 uses a flow chart to illustrate an alternate use of the RPOS, which is the construct specification for claim 3 in this application. The process again begins with Web Content Dealers. In this application the Web Content Dealers may or may not subscribe to the RPOS system (i.e. make their own CARDs). To facilitate the creation of a CARD for the WEB Content Dealers, a retail establishment supplies a computer or terminal as a customer access point, which provides Internet access, and issues a CARD to a customer upon entering the retail establishment. The customer browses the web and looks for content to purchase. Whenever a Web Content Dealer requires some sort of payment and the customer agrees, the customer authorizes payment from the retail establishment and by default the retail establishment agrees to the purchase. The customer is not required to enter his or her own name, credit card payment information, address, or any other information that they do not choose. Upon leaving the establishment, the customer pays the retail establishment the amount required for content received or to be received. The purpose of the CARD in this transaction is only to ensure that the user is in possession of it. The actual transaction takes place through an over the counter sale.

The processes described in FIG. 2 illustrate a subtle yet important difference from prior art used in Internet commerce, in that Internet access is only required for the customer to choose which media content to purchase and to later retrieve on whatever computer the customer chooses. Internet access is not required during the recording of specific media content locations (URLs); they can be simply written down, picked out from a written menu after having seen the web dealers preview pages, or retrieved as a menu item from the local computer at the check out. Internet access is also not required during the recording of the specific access information, or during the retail transaction. While Internet Access during these processes may be used to facilitate the RPOS processes, it is not required. While the CARD holds some intrinsic value it does not hold any dollar amount information, account information, or other means of payment; the transaction is completed in person at the checkout.

Figure 3:
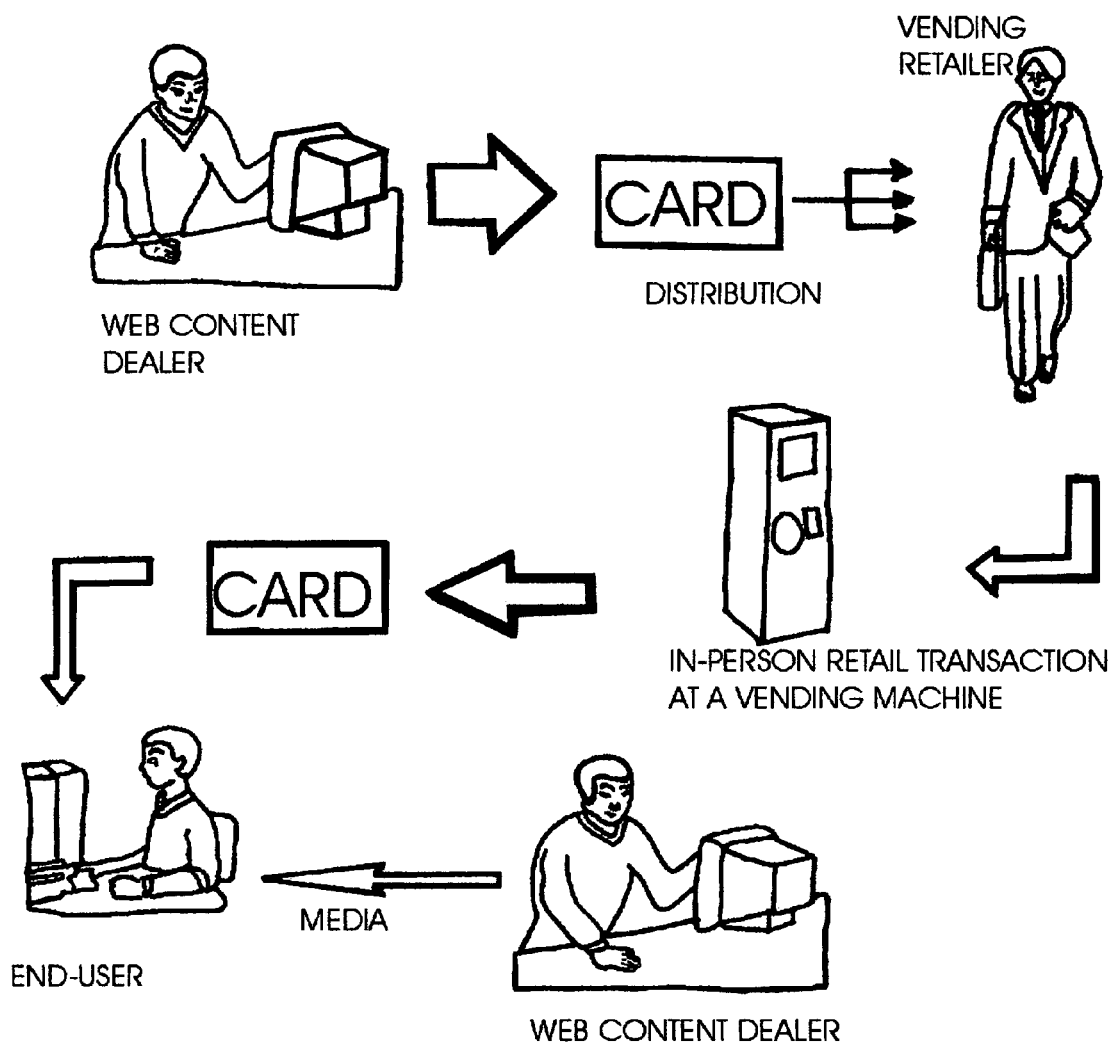

FIG. 3 uses a flow chart to illustrate an alternate use of the RPOS. The process again begins with Web Content Dealers. A Vending Machine Dealer purchases CARDs through normal product distribution channels. Customer purchases the CARD from the vending machine acquiring the ability to access the desired web content. This type of system is not capable of age verification as with over the counter sales. Again, the purpose of the CARD in this transaction is only to ensure that the user is in possession of it. The actual transaction takes place through a vending machine.

Figure 4:
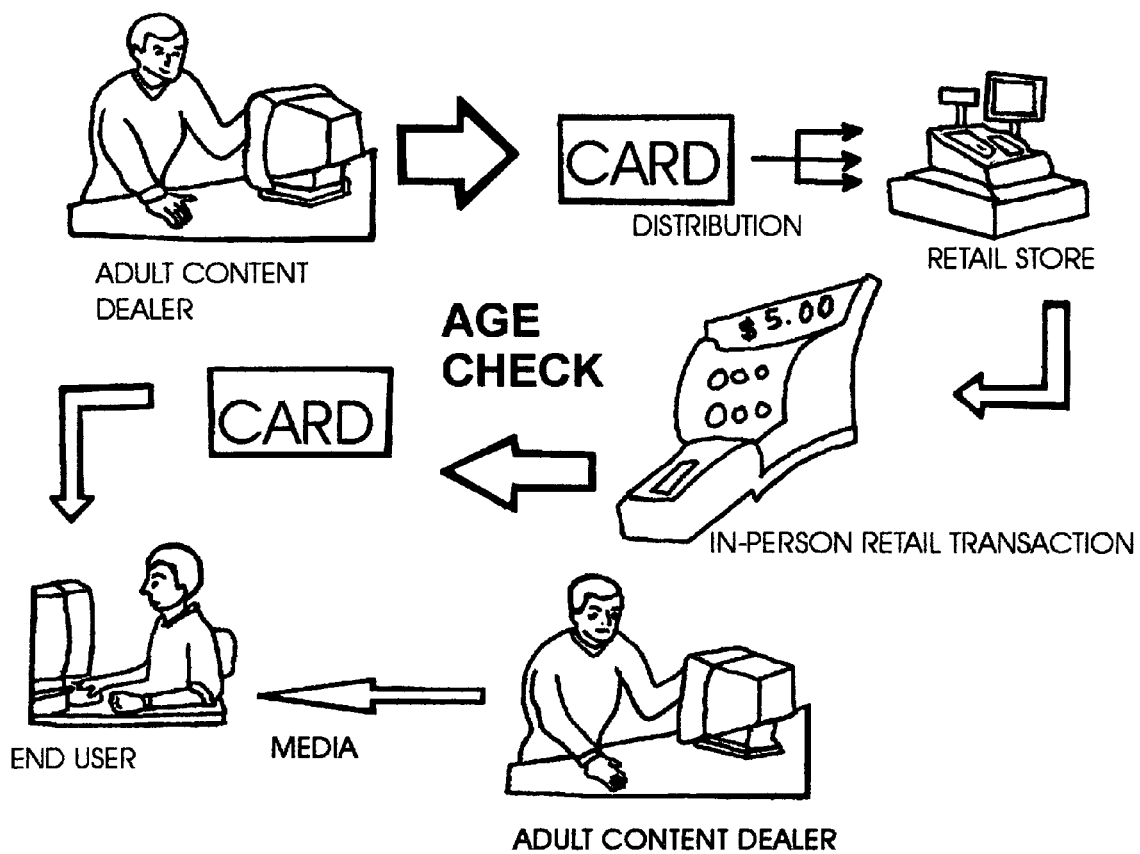

FIG. 4 illustrates how CARD is used as an age verification system (Adult Check). The process begins with dealers of adult materials on the Internet. A retail establishment (such as video rental store, convenience store, bookstore, adult merchandiser, or other type of store) obtains CARDs through typical distribution channels. Customers purchase the CARD over the counter provided they can prove they are of legal age to do so. Customer physically transports the CARD to a location where customer has access to a computer that is capable of receiving Web content. The customer uses the CARD to obtain access to those specific materials the seller of the CARD intended.

Figure 5:
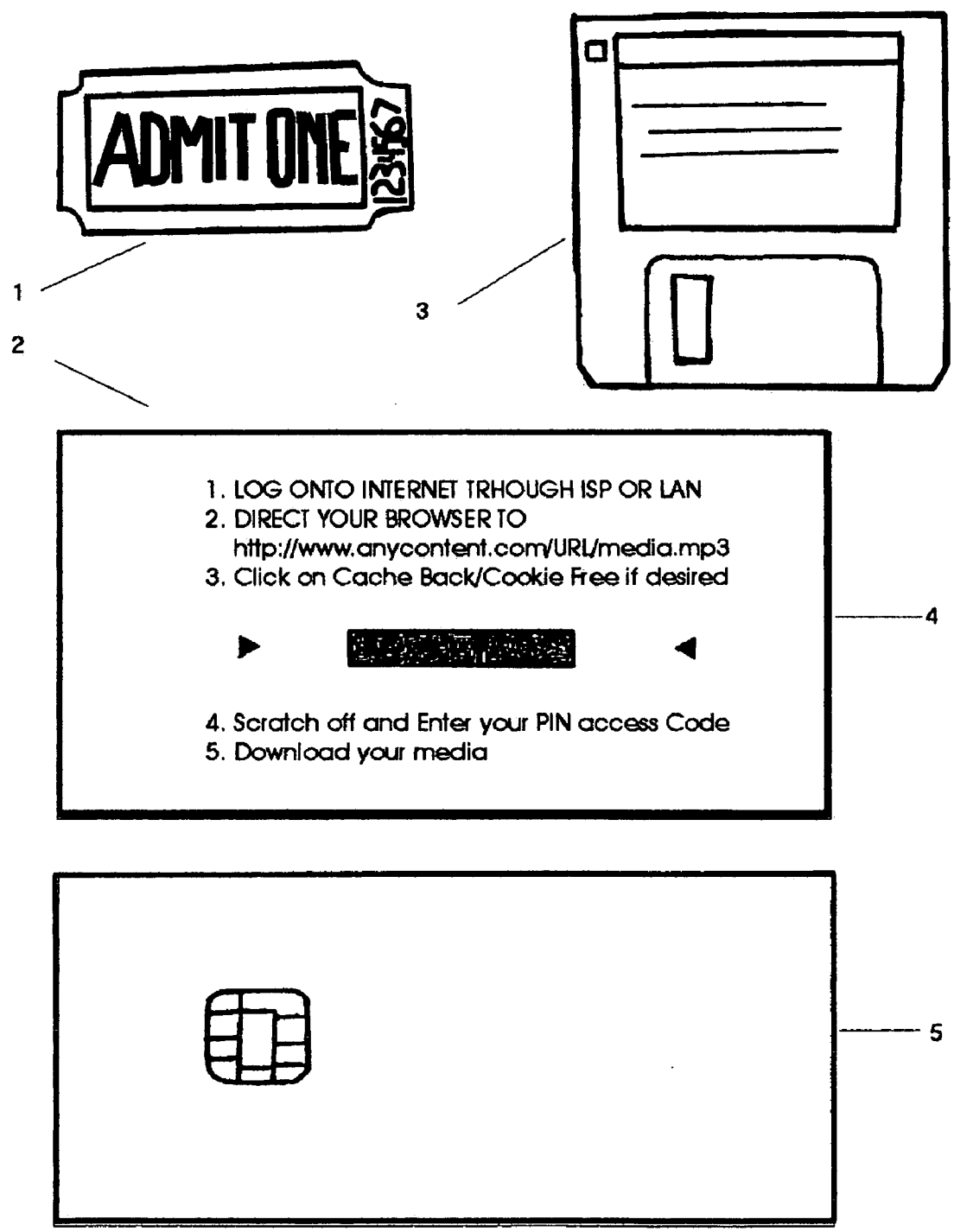

FIG. 5 shows some examples of recording devices that are used or could be modified for use as the media delivery method, access CARD, or to deliver the small cookie free cache back application.

Figure 6:
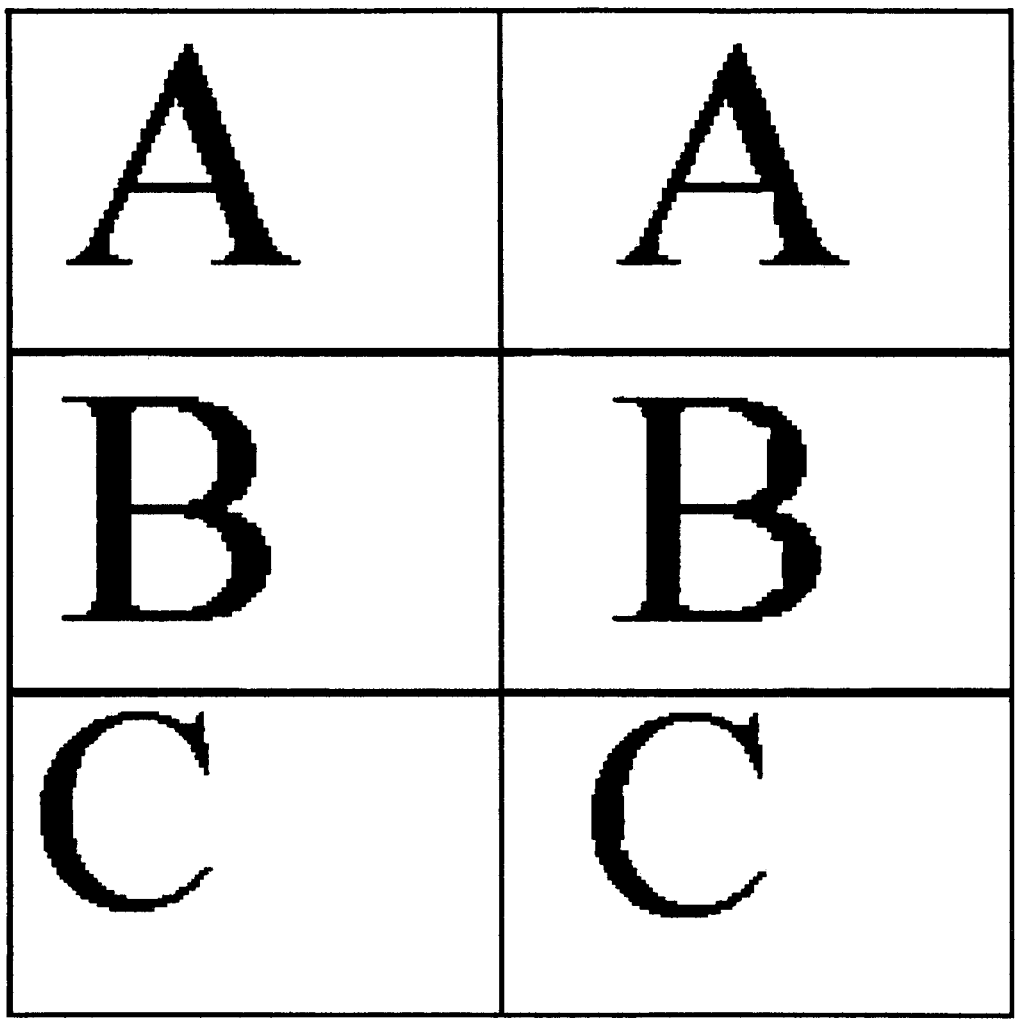

FIG. 6 is an example of Font Fingerprinting where a font subset file must be delivered to the user.

FIG. 7 is an example of Hidden Pixelization for Content Fingerprinting

Figure 8:
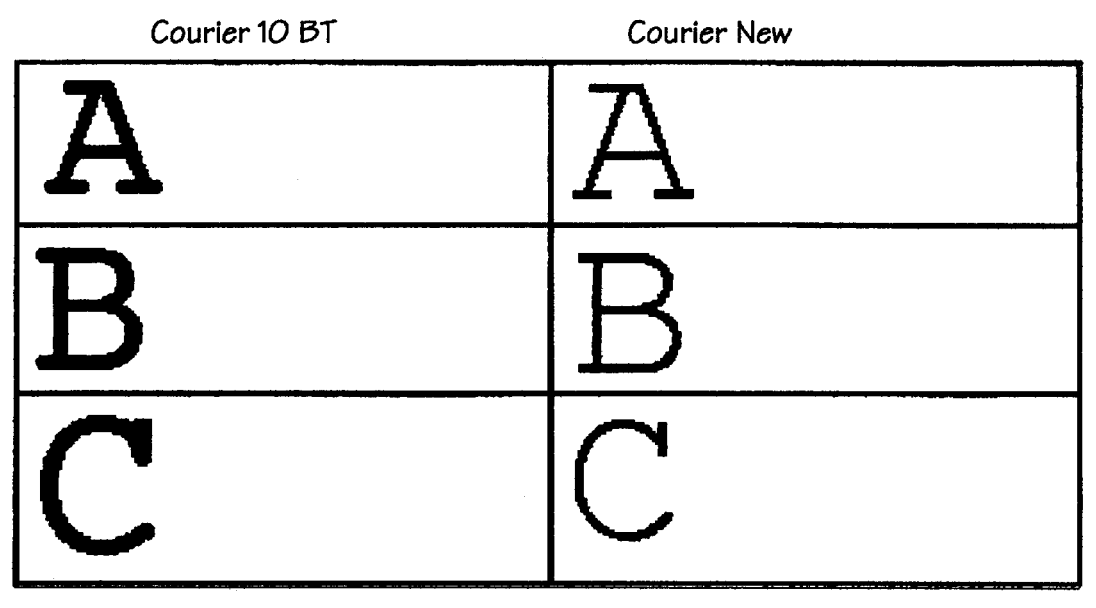

FIG. 8 illustrates the similarities between the New Courier font and the Courier 10 BT font.

Figure 9:
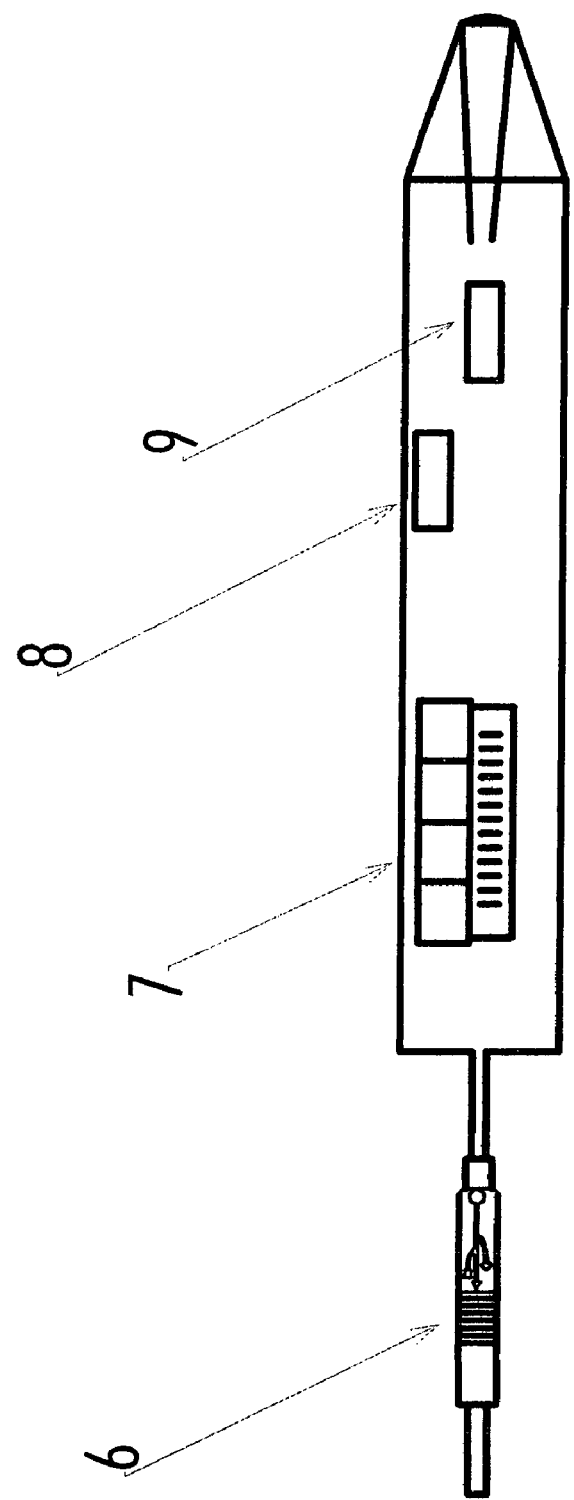

FIG. 9 illustrates the Scanner/CARD combination system. The barcode scanner portion of the Scanner/CARD device is made up of components well known in the art such as a metal shielded wand with a fiber optic bundle, light source and light detector. The programmable flash memory module, 7 is onboard to store data received by the scanning apparatus, and the USB interface, 6, in this embodiment allows for connection to most typical PC computer systems. The light emitter 8 and the CCD type imaging/light sensor unit for this embodiment show where the barcode data is received by the unit. The unit shown in the FIG. 9 is already fully commercially available as shown or in other varying shapes and sizes, thus the fine details of the workings need not be further explained herein. In this embodiment, the CARD portion of the Scanner/CARD device is again only to ensure that the user is in possession of it. The actual transaction takes place through scanning items and then checking out at a cashier, self serve check out, or other sales register where transfer of ownership rights is activated.

Figure 10:
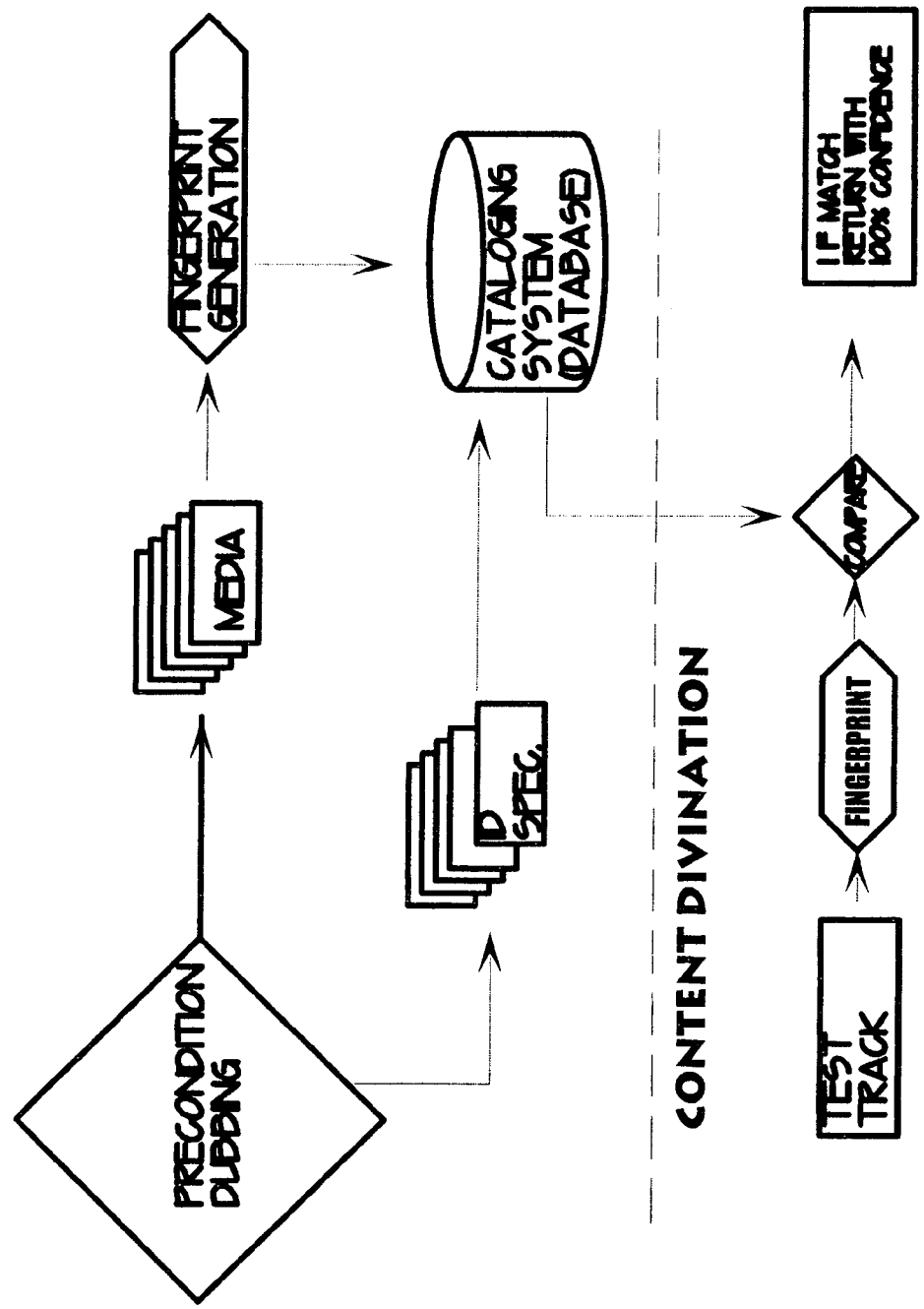

FIG. 10 is a graphical flow chart of the content fingerprinting process whereby the formula, Copy+SCMS+Impairment Validation=Legally Transferable Backup, may be accomplished in one or more embodiment of the invention.

The invention claimed is:

1. A method of virtual Internet based merchandise or media exchange for payment, comprising:
   creating specific information that is a computerized network transaction location of a product, said product comprising line itemized networked merchandise or line itemized downloadable media material objects on a selling computer on a network wherein a barcode or other identifier information of said product is scanned or stored as memory;
   transmitting said memory to a point of sale terminal;
   calculating or otherwise determining a price based on said transmitting that is specific to said product wherein payment of said price is through an in-person transaction at said retail point of sale location and said payment is designated for said product through said in-person transaction; and
   sending a message of said payment over said network causing transfer of ownership rights in said product to a buyer computer on said network through authorization on said selling computer on said network as a result of said payment.

2. A payment system for Internet merchandise or media, comprising:
   a retail point of sale establishment;
   a customer access point at said all point of sale establishment;
   URL information that is an Internet transaction location of said merchandise or media on a selling computer on a network;
   means for accepting payment through an in person transaction with a customer;
   means for storing and retrieving a record on or in one or more physical media corresponding to said Internet transaction location or to said merchandise or media;
   means for transfer of said one or more physical media from said retail point of sale establishment to said customer;
   means for Internet transaction authorization or other Internet transaction security on, in, or actuated from said physical media to facilitate transfer of ownership or rights in said Internet merchandise or media to said customer; and
   means to activate said authorization at point of sale, wherein said means to activate comprises:
     a physical medium with a first identification number that identifies said product and associates said product with said URL information that is an Internet transaction location of said merchandise or media and a second identification number that identifies said physical medium solely;
     means for reading of said first identification number to complete an activation or deactivation of said physical medium;
     means for reading said second identification number to transfer ownership of a product from a physical retail point of sale location to a consumer; and
     means for causing said selling computer on said network as a result of activation of said physical medium to authorize means for reading of said second identification number to transfer ownership.

3. A transaction authorization method for virtual network based merchandise or media over a public or private network comprising:
   placing specific information on a plurality of distribution nodes on a distribution network that comprises a specific product offered through said distribution network, said product comprising line itemized networked merchandise or line itemized downloadable media material objects on said distribution network;

specifying a price wherein said price is specific to said product wherein payment of said price is through an in-person transaction at a retail point of sale location wherein said payment is designated for said product through said in-person transaction; and sending a message of said payment over said network causing transfer of ownership rights in said product to an end-user device on said network through authorization said network as a result of said associating of said payment.

4. The transaction authorization method in claim 3 wherein said price further comprises:

setting said price to at least zero, comprising a price of free or any positive amount.

5. A method of vending a voucher to a purchaser, the method comprising:

providing customer access to a customer at a retail point of sale location;

creating a voucher containing specific information on, in, or actuated from said voucher where said information is a specification of a product, said product comprising line itemized networked merchandise or line itemized downloadable media material objects on a selling computer on a network;

accepting payment for said voucher through an in-person transaction at said retail point of sale location wherein said payment is at least zero;

sending a payment message as a response to said in-person transaction either directly or through other computers on said network to said selling computer on said network;

causing an authorization message to be created on said selling computer in or as a result of said payment message; and vending said voucher at said retail point of sale to said customer; wherein vending the voucher to said customer transfers ownership of said product comprising line itemized network merchandise or line itemized downloadable media material objects to said customer.

6. A method of virtual Internet based merchandise or media exchange for payment, comprising:

providing customer access to a customer at a retail point of sale location;

specifying a product, said product comprising line itemized networked merchandise or line itemized downloadable media material objects on a selling computer on a network;

accepting payment for said product through an in-person transaction at said retail point of sale location wherein said payment is at least zero;

sending a payment message as a response to said in-person transaction either directly or through other computers on said network to said selling computer on said network;

causing an authorization message to be created on said selling computer in or as a result of said payment message; and transferring ownership of said product to said customer wherein said product can be engaged by a customer device on said network.

7. The method according to claim 6, wherein the network comprises the world wide web.

8. The method according to claim 6, wherein the network comprises a telephonic network.

9. The method according to claim 6, wherein the network comprises items selected from the group consisting of satellites, cable television, and digital wireless.

10. The method according to claim 6, wherein the authorization comprises an access key.

11. The method according to claim 10, wherein the access key comprises a code.

12. The method according to claim 6, wherein the in-person transaction at said retail point of sale comprises a face to face interaction between two or more persons.

13. The method according to claim 6, wherein the retail point of sale comprises a checkout, kiosk, cashier's station, cash register, self-check out, self-service, or other means of customer interaction within an establishment.

14. The method according to claim 13, wherein the establishment comprises a retail store, convenience store, vending machine, parking lot, hallway, lobby, or other physical place to conduct business.

15. The method according to claim 6, wherein the retail point of sale comprises a means for accepting a payment through an in-person transaction with a customer wherein said payment is designated for the purchase of the line itemized network merchandise or line itemized downloadable media material objects.

16. The method according to claim 6, wherein the retail point of sale comprises a means for accepting a payment through an in-person transaction with a customer wherein said payment is designated for the purchase of a license for the itemized network merchandise.

17. The method according to claim 6, wherein the retail point of sale comprises a means for accepting a payment through an in-person transaction with a customer wherein said payment is designated for the purchase of a voucher.

18. The method according to claim 6, wherein the itemized network merchandise comprises a physical object.

19. The method according to claim 6, wherein said engaged by a customer device on said network is at a network location separate from the retail point of sale.

20. The method according to claim 6, wherein said selling computer on said network is at a network location separate from the retail point of sale.

21. The method according to claim 6, wherein retrieving said product allows said customer to record the itemized network merchandise.

22. The method according to claim 21, wherein recording the itemized network merchandise comprises recording the itemized network merchandise to a memory device, disk, compact disk, cassette, VHS tape, or other recording media.

23. The method according to claim 6, wherein the product is a free sample.

24. A method of virtual Internet based merchandise or media exchange for payment, comprising:

specifying a product, said product comprising line itemized networked merchandise or line itemized downloadable media material objects on a selling computer on a network wherein payment for said product is through an in-person transaction at a retail point of sale location wherein said payment is at least zero;

receiving a payment message on said selling computer on said network as a response to said in-person transaction either directly or through other computers on said network;

causing an authorization message to be created on said selling computer in or as a result of said payment message; and transferring ownership of said product to said customer.

25. The method according to claim 24, wherein the network comprises the world wide web.

26. The method according to claim 24, wherein the network comprises a telephonic network.

27. The method according to claim 24, wherein the network comprises items selected from the group consisting of satellites, cable television, and digital wireless.

28. The method according to claim 24, wherein the authorization comprises an access key.

29. The method according to claim 28, wherein the access key comprises a code.

30. The method according to claim 24, wherein the in-person transaction at said retail point of sale comprises a face to face interaction between two or more persons.

31. The method according to claim 24, wherein the retail point of sale comprises a checkout, kiosk, cashier's station, cash register, self-check out, self-service, or other means of customer interaction within an establishment.

32. The method according to claim 31, wherein the establishment comprises a retail store, convenience store, vending machine, parking lot, hallway, lobby, or other physical place to conduct business.

33. The method according to claim 24, wherein the retail point of sale comprises a means for accepting a payment through an in-person transaction with a customer wherein said payment is designated for the purchase of the line itemized network merchandise or line itemized downloadable media material objects.

34. The method according to claim 24, wherein the retail point of sale comprises a means for accepting a payment through an in-person transaction with a customer wherein said payment is designated for the purchase of a license for the itemized network merchandise.

35. The method according to claim 24, wherein the retail point of sale comprises a means for accepting a payment through an in-person transaction with a customer wherein said payment is designated for the purchase of a voucher.

36. The method according to claim 24, wherein the itemized network merchandise comprises a physical object.

37. The method according to claim 24, wherein said engaged by a customer device on said network is at a network location separate from the retail point of sale.

38. The method according to claim 24, wherein said selling computer on said network is at a network location separate from the retail point of sale.

39. The method according to claim 24, wherein retrieving said product allows said customer to record the itemized network merchandise.

40. The method according to claim 29, wherein recording the itemized network merchandise comprises recording the itemized network merchandise to a memory device, disk, compact disk, cassette, VHS tape, or other recording media.

41. The method according to claim 24, wherein the product is a free sample.

* * * * *

UNITED STATES PATENT AND TRADEMARK OFFICE
CERTIFICATE OF CORRECTION

PATENT NO. : 7,742,993 B2  Page 1 of 1
APPLICATION NO. : 11/329526
DATED : June 22, 2010
INVENTOR(S) : James Leonard Driessen and Joshua Aker It is certified that error appears in the above-identified patent and that said Letters Patent is hereby corrected as shown below:

1. Column 14, line 28 of the published patent, which is a line of Claim 2, which reads, "a customer access point at said all point of sale establish-"

is corrected to read, "a customer access point at said retail point of sale establish-"

2. Column 15, lines 12-14 of the published patent, which are lines of Claim 3, which read, "end-user device on said network through authorization said network as a result of said associating of said payment."

is corrected to read, "end-user device on said network through authorization on said network as a result of said associating of said payment."

3. Column 18, line 21 of the published patent, which is a line of Claim 40, which reads, "40. The method according to claim 29, wherein recording"

is corrected to read, "40. The method according to claim 39, wherein recording"

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,742,993 B2 | Page 1 of 1 |
| APPLICATION NO. | : 11/329526 | |
| DATED | : June 22, 2010 | |
| INVENTOR(S) | : James L Driessen and Joshua Aker | |

It is certified that error appears in the above-identified patent and that said Letters Patent is hereby corrected as shown below:

1. Column 15, line 13 of the published patent, which is a line of claim 3, which relevant portion reads, "associating"

is corrected to read, "sending a message"

Signed and Sealed this

Eleventh Day of October, 2011

David J. Kappos
*Director of the United States Patent and Trademark Office*